United States Patent [19]

Besson

[11] 4,355,465
[45] Oct. 26, 1982

[54] HANDLES FOR HOUSEHOLD UTENSILS

[75] Inventor: Gilbert Besson, Grenoble, France

[73] Assignee: A. Raymond, Lorrach, Fed. Rep. of Germany

[21] Appl. No.: 191,020

[22] Filed: Sep. 26, 1980

[30] Foreign Application Priority Data

Sep. 29, 1979 [DE] Fed. Rep. of Germany ....... 2939306

[51] Int. Cl.³ .............................................. B25G 3/00
[52] U.S. Cl. ......................................... 30/344; 30/342
[58] Field of Search .......................... 30/344, 342, 340

[56] References Cited

U.S. PATENT DOCUMENTS

| 1,485,571 | 3/1924 | Stevens | 30/342 |
| 1,993,170 | 3/1935 | Havener | 30/342 |
| 2,154,012 | 4/1939 | Rhodes | 30/344 |
| 2,492,096 | 12/1949 | Juengst | 30/344 |
| 2,671,668 | 3/1954 | Krause et al. | 30/342 |

FOREIGN PATENT DOCUMENTS

| 963021 | 12/1949 | France | 30/340 |
| 1375884 | 9/1964 | France . | |
| 2430296 | 3/1980 | France | 30/344 |
| 394031 | 6/1933 | United Kingdom | 30/344 |
| 977007 | 12/1964 | United Kingdom . | |
| 1456878 | 12/1976 | United Kingdom . | |

Primary Examiner—Stephen G. Kunin
Assistant Examiner—J. T. Zatarga
Attorney, Agent, or Firm—Finnegan, Henderson, Farabow, Garrett & Dunner

[57] ABSTRACT

A handle made from a plastic material is used to grip support blades of household utensils, in particular kitchen knives. It consists of two handle halves resting on both sides of the support blade and terminating flush with the rim of the support blade and solidly joined together by rivet elements. To lower manufacturing costs for mass-produced articles and simultaneously ensure firm seating of the support blade in the handle, one of the handle halves is integral with at least two projecting rivet sockets and the other handle half is integral with an equal number of corresponding rivet pins. The rivet sockets are such in their outside diameters that they pass with slight play through the passage holes in the support blade and in that they are pressed hard in position against the edge of the passage holes when the rivet pins are introduced.

3 Claims, 9 Drawing Figures

HANDLES FOR HOUSEHOLD UTENSILS

BACKGROUND OF THE INVENTION

I. Field of the Invention

The present invention relates to handles made of a plastic material for the support blade of household utensils consisting of two handle halves resting on both sides against the support blade and flush with its rim and integral rivet means to join the two handle halves after inserting the support blade.

II. Description of the Prior Art

Handles for household utensils have generally been fixed by rivets or metal pins to the support blade of the utensil, such fastening means being passed through holes present both in the handle and in the support blade. These rivets are longer than the thickness of the handle joined to the support blade. The projecting rivet part is clinched by means of a press which exerts an extremely high clinching force.

Accordingly, the projecting rivet end is deformed by the press in such a manner that a solid junction is obtained between the handle the blade. Nevertheless, there is the danger that in this operation the handle of the kitchen utensile may be damaged. Also, the deformation of the rivets is restricted to both ends so that the play between the blade of the kitchen utensil and said rivets is not always necessarily eliminated.

French patent 1 375 884 describes a process for making knife handles with the object of eliminating the above shortcoming. This process makes use of metal pins which are mutually joined by welding.

It is obvious that this process is expensive because of the number of parts involved and in no way suited to the manufacture of household utensils for which the handle is made by casting thermoplastic materials. Indeed the fusion temperature of the plastic is substantially lower than that of the metal, so that necessarily the handle parts would be destroyed where in contact with the rivets.

SUMMARY OF THE INVENTION

It is, accordingly, the object of the present invention to provide a plastic handle for household utensils which eliminates the play between the support blade and the handle and inherently averting the problem of the tolerances of the fixing holes necessarily arising when manufacturing the handle.

Another object of the present invention is to provide such a plastic handle with decreased manufacturing costs by reducing the number of parts required for manufacture.

A further object of the present invention is to provide such a plastic handle which allows for automatically joining the two parts forming the handle to the support blade of the household utensil.

It is also an object of the present invention to provide such a plastic handle which allows for joining the two parts forming the handle to the support blade of the household utensil by hand with a small press.

A still further object of the present invention is to provide such a plastic handle where the rivet sockets and pins each are integral with the two handle parts.

Furthermore, it is still another object of the present invention to provide such a plastic handle where the rivet sockets and pins are of the same color as the handle.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects, and in accordance with the purposes of the invention as embodied and broadly described herein, a handle made of plastic for support blades of household utensils consisting of two handle halves resting on both sides of the support blade and terminating flush with the blade rim, and of rivet elements to join the handle halves after the support blade has been inserted between them is provided the improvement comprising one of the handle halves is integral with at least two projecting rivet sockets and that the other handle half is integral with the same number of corresponding rivet pins, the outside diameter of the rivet sockets being such that they pass through the passage holes in the support blade with slight play and in that they will be forced hard in position against the rim of the passage holes when the rivet pins are introduced.

BRIEF DESCRIPTION OF THE DRAWINGS

The accompanying drawings, which are incorporated and constitute a part of this specification, illustrate a preferred embodiment of the invention and, together with the general description of the invention given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings.

The above general description and the following detailed description are merely illustrative of the generic invention, and additional modes, advantages, and particulars of this invention will be readily suggested to those skilled in the art without departing from the spirit or scope of the invention.

Figure 1:
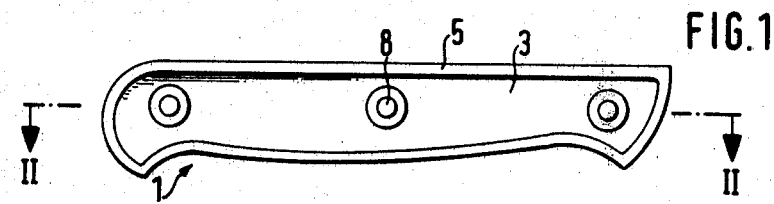
FIG. 1 is a sideview of the handle part, with a view of the rivet pins.
Figure 2:
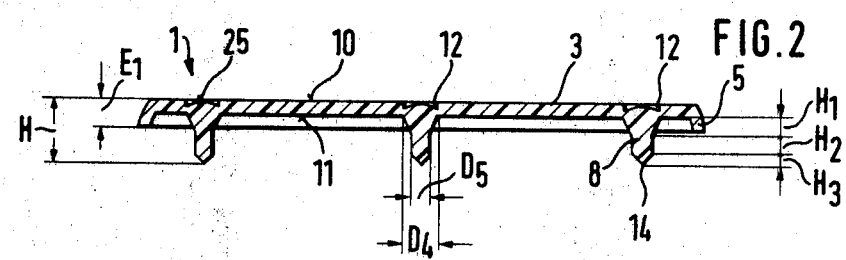
FIG. 2 is a lengthwise section along line AA of FIG. 1.
Figure 5:
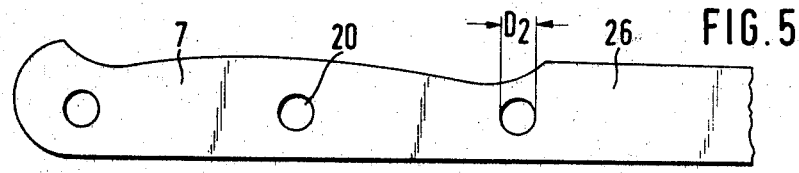
FIG. 5 is the support blade of a kitchen knife, shown in sideview.
Figure 6:
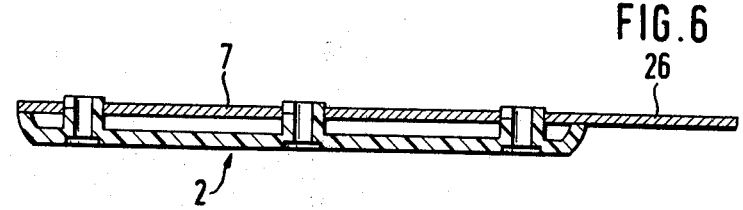
FIGS. 6–8 are the individual stages in assembling the handle.

The handle part as shown in FIG. 1 and FIG. 2 is cast from a thermoplastic material and essentially consists of a handle strip 3 bounded by a bent-over rim 5, the outer shape of this rim corresponding precisely to that of the support blade 7 of a kitchen knife 26 as shown in FIG. 5. This handle strip 3 comprises three arcuate recesses 12 at its outside 10 which look like rivet heads and thereby endow the handle of the kitchen with the traditional appearance.

The handle strip 3 comprises three rivet pins 8 on its inside 11. Each of these rivet pins 8 begins at the inside 11 of the handle strip 3 at a diameter $D_4$ and proceeds in a conical shape through a height $H_1$. The rivet pins 8 then proceed through a height $H_2$ in a cylindrical form of diameter $D_5$ and tapers through a height $H_3$ into a point 14. The spacing H between the peak 25 of the recess 12 and the point 14 of the rivet pin exceeds the sum of the handle part 1 thickness $E_1$ of FIG. 2, support blade 7 thickness $E_2$ of FIG. 8 and handle part 2 thickness $E_3$ of FIG. 3. The conical part of the rivet pin 8 which proceeds through a height $H_1$ projects at least by the support blade 7 thickness $E_3$ of FIG. 8 beyond the rim 5 of the handle part 1.

Figure 3:
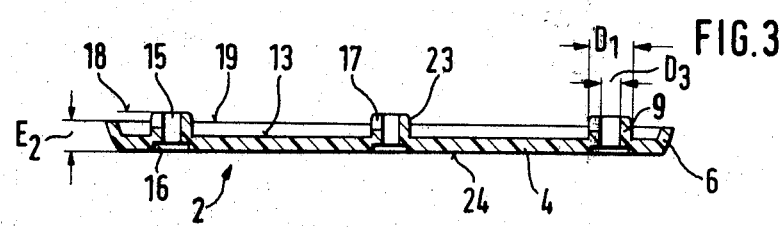
FIG. 3 is a lengthwise section along line BB of FIG. 4.
Figure 4:
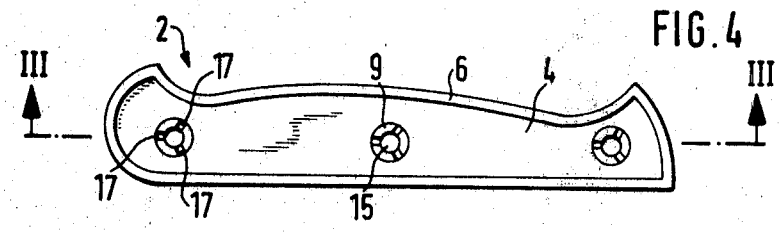
FIG. 4 is a sideview of the handle part with a view of the rivet sockets.
Figure 8:
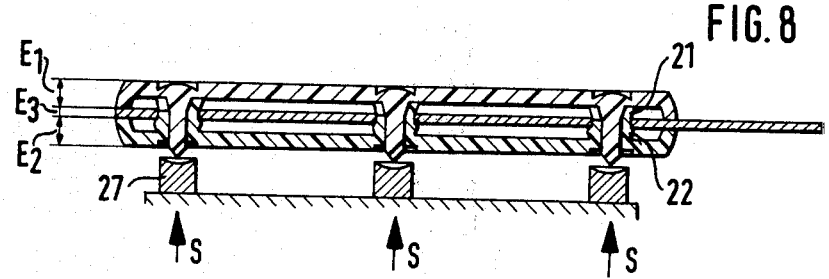

The handle part 2 shown in FIG. 3 and FIG. 4 also is made of a cast thermoplastic material and essentially consists of a matching strip 4, which matches handle strip 3, bounded by a bent-over rim 6 of which the outer shape corresponds precisely to that of the support blade 7 of the kitchen knife 26 as shown in FIG. 5 and of which the support blade thickness $E_2$ as exemplified in FIG. 8 equals the thickness $E_1$ of the handle element 1 as shown in FIG. 2.

This matching strip 4 is pierced by three circular holes 15 which in turn are provided with countersunk holes 16 on the outside 24 of the strip 4.

On the inside 13 of the handle part 2 and in extension of the three holes 15, the matching strip 4 comprises on both sides open rivet sockets 9 of which the end face 18 projects beyond the rim 6 of the handle part 2 so as to permit insertion of the open rivet sockets 9 into the holes 20 of support blade 7 as depicted in FIG. 5.

The rivet socket 9 is divided by at least two, preferably three slits 17 extending from the end face 18 at least as far as the edge 19 of the bent-over rim 6. The outside diameter $D_1$ of the rivet socket 9 is slightly less than the diameter $D_2$ of hole 20 in the support blade 7 in FIG. 5. The inside diameter $D_3$ of said rivet socket 9 is slightly less than the diameter $D_4$ of the rivet pin 8 but larger than the diameter $D_5$ of said pin 8 as shown in FIG. 2.

To better describe all the advantages from using the invention, FIG. 6 through FIG. 9 show the various stages of assembly. It will be noted that at the assembly time shown in FIG. 6, the rivet sockets 9 are located inside the round holes 20 in the support blade 7 of the kitchen knife 26, and that in FIG. 7, the cylindrical part of the rivet pin 8 extending through height $H_2$ in turn has penetrated the inside of the rivet socket 9. In this stage of the assembly, the outer edge 19a of the bent-over rim 5 is not yet in contact with the support blade 7. Furthermore, there is play between the outer wall 23 of the rivet socket 9 and the round hole 20 in the handle blade 7.

Referring to FIG. 8, if, for instance, using a press (omitted) a pressure is exerted in the direction of the arrows F until the bent-over rims 5 and 6 make contact with the support blade 7, then the conical part of rivet pin 8 which passes through the height $H_1$ will penetrate the hole 15 of the rivet socket 9.

As diameter $D_4$ depicted in FIG. 2 is larger than the inside diameter $D_3$ of the rivet socket 9, FIG. 3, the rivet pin 8 under the effect of the pressure exerted in the direction of the arrows F widens thwe rivet socket 9 and thus causes it to expand. This expansion is further favored by the presence of the slits 17 in the rivet socket 9, and as a result the play between thwe holes 20 in the support blade 7, the rivet sockets 9 and the rivet pins 8 is so-to-speak pressed away. There remains only the implementation of a pressure from the force 27 indicated in FIG. 8 of a press (omitted) in the direction of the arrows S in order to deform the tips 14 of the rivet pins 8 and thus their riveting into place as in FIG. 9.

FIG. 8 also shows how the rivet socket 9 under the action of the rivet pin 8 fills the round holes 20 in the support blade 7. It will be noted that the material forming the walls of the rivet socket 9 makes beads 21 and 22 on each side of the support blade 7 and that thereby any possible play between the support blade 7 and the handle parts 1 and 2 is eliminated.

Figure 7:
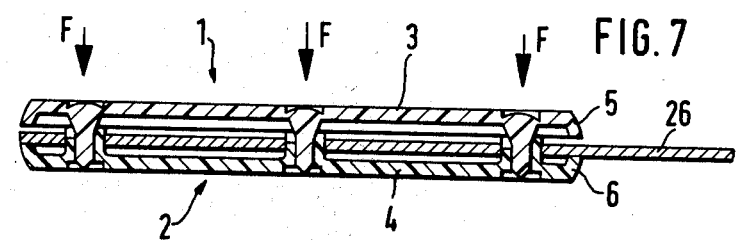
Figure 9:
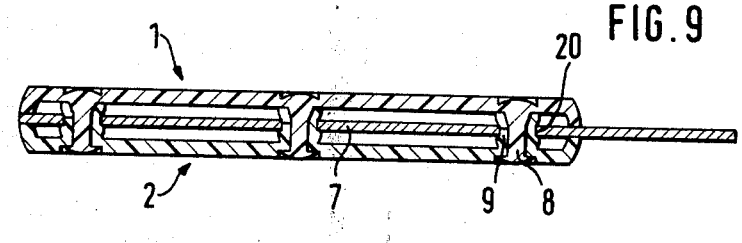
FIG. 9 is the handle in the assembled condition.

FIG. 9 shows a completed handle after pressure has been exerted in the direction of arrows F in FIG. 7 and a pressure has been applied in the direction of arrows S in FIG. 8.

The invention can be applied to the manufacture and assembly of handles of a variety of articles, for instance household articles, tool elements, large firearms, etc.

Additional advantages and modifications will readily occur to those skilled in the art. The invention in its broader aspects is therefore not limited to the specific details, representative apparatus, and illustrative examples shown and described. It is understood that all conceivable modifications in the shape of the handle, in particular by substituting technical equivalent means, may be resorted to without thereby transcending the scope of the invention. Accordingly, departures may be made from such details without darpting from the spirit or scope of applicant's general inventive concept.

I claim:

1. In a handle made of plastic for an apertured support blade of a household utensil comprising: (a) two handle havles resting on both sides of the support blade and terminating flush with the blade rim, and (b) rivet elements to join the handle halves after the support blade has been inserted between them, the improvement wherein the rivet elements comprise at least two projecting rivet sockets formed as one piece with one of the handle halves and the same number of corresponding rivet pins formed as one piece with the other handle half, the outside diameter of the rivet sockets being such that they pass through the apertures of the support blade when the rivet pins are introduced into the rivet sockets, and wherein each rivet pin consists of three segments $H_1$, $H_2$ and $H_3$ of which the segment $H_1$ beginning at the inside wall of the handle half tapers down to a cross section corresponding to the inside diameter of the rivet socket, the next section $H_2$ remaining at this diameter and the third section $H_3$ ending in a tip which extends sufficiently beyond the rivet socket that it projects by an amount sufficient for clinching on the back side of said socket, and wherein each of said rivet sockets includes at least two slits uniformly distributed along its circumference and extending approximately from its center to its end face for facilitating expansion of the rivet socket when the tapered segment $H_1$ of the rivet pin is introduced into the rivet socket.

2. In a handle of the type claimed in claim 1 wherein the handle half provided at its outside with rivet sockets comprises countersinks around the holes of the rivet sockets to seat the clinched rivet pin tips.

3. In a handle of the type claimed in claim 2 wherein there is an embossing similar to each of the clinched rivet pin tips at the outside of the handle half provided with pins, in extension of these rivet pins.

* * * * *